US 8,045,619 B2

(12) United States Patent
Lee et al.

(10) Patent No.: US 8,045,619 B2
(45) Date of Patent: Oct. 25, 2011

(54) MOTION ESTIMATION APPARATUS AND METHOD

(75) Inventors: Ho-young Lee, Suwon-si (KR); Dmitriv Vatolin, Moscow (RU); Chang-yeong Kim, Yongin-si (KR); Du-sik Park, Suwon-si (KR); Bo-won Jeon, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1511 days.

(21) Appl. No.: 11/336,837

(22) Filed: Jan. 23, 2006

(65) Prior Publication Data

US 2006/0188022 A1 Aug. 24, 2006

(30) Foreign Application Priority Data

Feb. 22, 2005 (KR) .................. 10-2005-0014530

(51) Int. Cl.
*H04N 7/12* (2006.01)
(52) U.S. Cl. ......... 375/240.16; 375/240.12; 375/240.01; 375/240.24; 375/240.18
(58) Field of Classification Search ............. 375/240.16, 375/240.12, 240.01
See application file for complete search history.

(56) References Cited

U.S. PATENT DOCUMENTS

| | | | |
|---|---|---|---|
| 7,260,148 B2* | 8/2007 | Sohm ..................... 375/240.16 |
| 7,474,699 B2* | 1/2009 | Kobayashi et al. ...... 375/240.16 |
| 7,684,492 B2* | 3/2010 | Seo .......................... 375/240.27 |
| 7,693,218 B2* | 4/2010 | Hubrich et al. .......... 375/240.16 |
| 2002/0012396 A1* | 1/2002 | Pau et al. ................. 375/240.16 |
| 2003/0012286 A1* | 1/2003 | Ishtiaq et al. ............ 375/240.27 |
| 2003/0161403 A1* | 8/2003 | Yang ........................ 375/240.16 |
| 2004/0190623 A1* | 9/2004 | Lunter ..................... 375/240.16 |
| 2004/0202245 A1* | 10/2004 | Murakami et al. ............ 375/240 |
| 2004/0247031 A1* | 12/2004 | Hagai et al. .............. 375/240.16 |
| 2004/0258154 A1* | 12/2004 | Liu et al. ................. 375/240.16 |
| 2005/0063467 A1* | 3/2005 | Hekstra et al. ........... 375/240.16 |
| 2005/0105615 A1* | 5/2005 | El-Maleh et al. ........ 375/240.12 |
| 2005/0201462 A1* | 9/2005 | Ridge et al. ............. 375/240.16 |

FOREIGN PATENT DOCUMENTS

KR 2001-83717 9/2001

OTHER PUBLICATIONS

Office Action issued on Aug. 29, 2006 by the Korean Intellectual Property Office for Korean Patent Application No. 2005-14530.

* cited by examiner

*Primary Examiner* — Kenneth Lam
(74) *Attorney, Agent, or Firm* — Staas & Halsey LLP

(57) ABSTRACT

A motion estimation apparatus and method is disclosed. The apparatus includes a block error calculator to calculate a specified block error based on a candidate motion vector previously estimated and spatiotemporarily neighboring on a present block; a motion estimation mode decider to decide a motion estimation mode for the present block to be processed based on the calculated block error; and a motion vector estimator to estimate a last motion vector in the decided motion estimation mode.

33 Claims, 4 Drawing Sheets

FIG. 1A
FIG. 1B
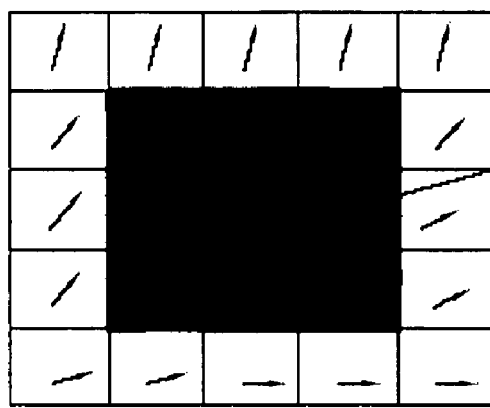
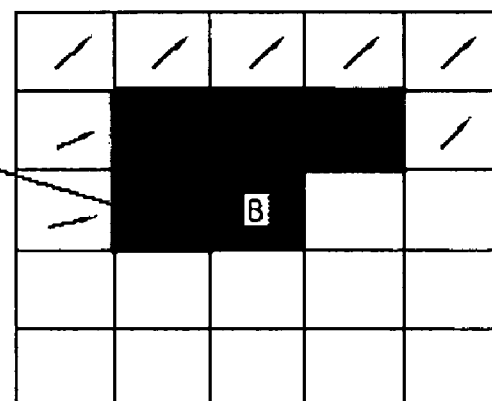

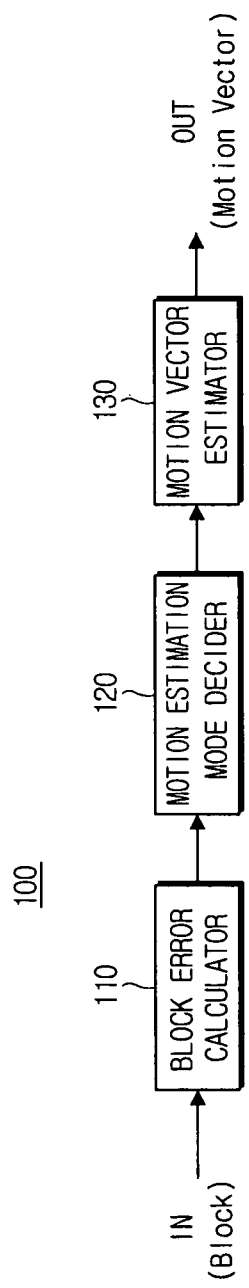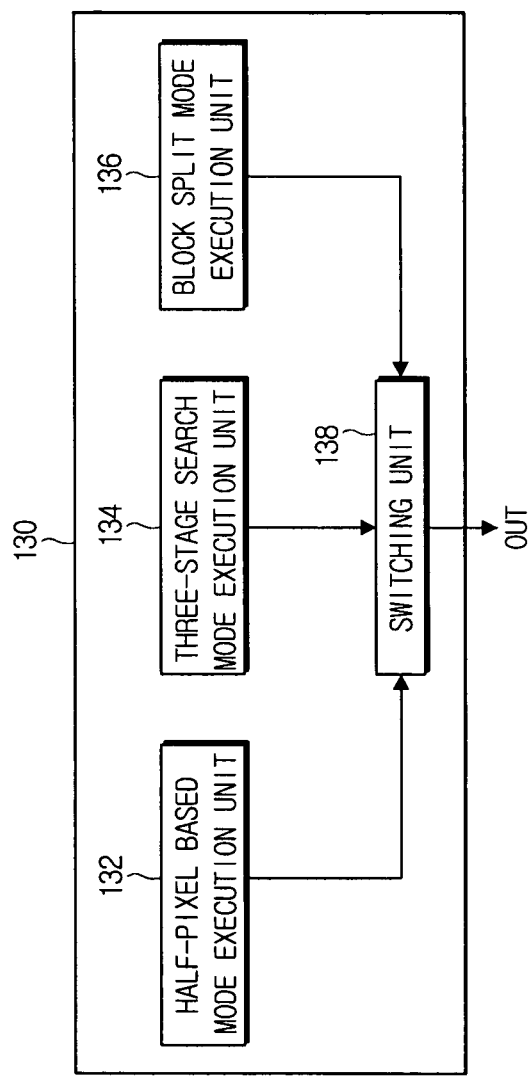

MOTION ESTIMATION APPARATUS AND METHOD

CROSS-REFERENCE TO RELATED APPLICATION

This application claims the benefit of Korean Application No. 2005-14530, filed Feb. 22, 2005, in the Korean Intellectual Property Office, the disclosure of which is incorporated herein by reference.

BACKGROUND OF THE INVENTION

1. Field of the Invention

An aspect of the present invention relates to a motion estimation apparatus and method, and more particularly, to a motion estimation apparatus and method that extracts an even motion vector with a high reliability even in a video format conversion technology.

2. Description of the Related Art

In image processing operations, such as frame rate up-conversion (FRC) and interlaced to progressive conversion (IPC), motion estimation between image frames is necessarily performed.

A motion estimation technology estimates a motion vector for motion compensation, and is one of the most core technologies to improve picture quality in various video-processing systems. In general, motion estimation is performed using a block matching algorithm.

The block matching algorithm compares two sequentially inputted frames and fields in the unit of a block, and estimates one motion vector per block. The motion vector is estimated using a motion prediction error value, for example, a sum of absolute difference values (SAD values), and, in a motion compensation process, the motion compensation is performed using the estimated motion vector.

Recently, the motion estimation technology has been widely used in noise reduction operations based on motion compensation, an image compression based on motion compensated prediction, and a video format conversion using motion compensated interpolation.

In the image compression technology based on the motion compensated prediction, a motion estimation technology is mainly used to eliminate temporal redundancy between frames of a moving image.

On the contrary, in the video format conversion technology, the motion estimation technology is used to interpolate and create image data in a spatiotemporal position that has not been stored or transmitted. Therefore, the video format conversion technology requires the motion estimation technology to extract an even motion vector with a high reliability in comparison to the image compression technology.

SUMMARY OF THE INVENTION

The present invention has been developed in order to solve the above and/or other drawbacks and other problems associated with the conventional methods.

An aspect of the present invention provides a motion estimation apparatus and a method of extracting a smooth motion vector with a high reliability, using a correlation of a motion vector of a previous frame and a motion vector of an adjacent block of a present block and a block matching error characteristic.

Additional and/or other aspects and advantages of the invention will be set forth in part in the description which follows and, in part, will be obvious from the description, or may be learned by practice of the invention.

The foregoing and/or other aspects and advantages are substantially realized by providing a motion estimation apparatus, according to the present invention, which includes a block error calculator to calculate a specified block error based on candidate motion vectors pre-estimated and spatiotemporarily neighboring on a present block; a motion estimation mode decider to decide a motion estimation mode for the present block to be processed based on the calculated block error; and a motion vector estimator to estimate a final motion vector in the decided motion estimation mode.

The candidate motion vector may be a motion vector for a block having a motion vector previously estimated before the present block to be processed. The candidate motion vectors may comprise nine blocks of a previous frame and four blocks of a present frame, using a spatiotemporal correlation.

The block error may have candidate motion vector variance, average compensation error, and minimal SAD (Sum of Absolute Difference).

The block error calculator calculates the candidate motion vector variance ($MV_{var}$) using the following Equation:

$$MV_{var} = \frac{1}{N} \sum_{D \in CS} \left\| D - \frac{1}{N} \sum_{D \in CS} D \right\|^2$$

where, n denotes the number of total candidate motion vectors, D denotes a candidate motion vector, and CS denotes a set of total candidate motion vectors.

The block error calculator calculates the average compensation error ($Error_{Avg}$) using the following the Equation:

$$\alpha = 2 \times \frac{\sqrt{D_x^2 + D_y^2}}{\sqrt{D_{maxx}^2 + D_{maxy}^2}}$$

$$CompError(D) = SAD(D) \times \alpha$$

$$Error_{Avg} = \frac{1}{N} \sum_{D \in CS} CompError(D)$$

where, α denotes a scaling constant, Dx and Dy denote motion vectors in directions of x and y axes, Dmaxx and Dmaxy denote maximal motion vectors in directions of x and y axes, and CompError(D) denotes a scaling value of SAD(D).

The block error calculator calculates the minimal SAD ($SAD(D)_{min}$) using the following Equation:

$$SAD(D)_{min} = \min_{D \in CS} SAD(D)$$

where, D denotes a candidate motion vector, and CS denotes a set of total candidate motion vectors.

The motion estimation mode decider employs a half-pixel based motion estimation mode if the candidate motion vector variance, the average compensation error, and the minimal SAD are all less than threshold values.

The motion estimation mode decider employs a block split mode if the candidate motion vector variance and the average compensation error are less than the threshold values, and the minimal SAD is greater than a threshold value.

The motion estimation mode decider employs a three-stage search mode if the candidate motion vector variance is less than the threshold value, and the average compensation error is greater than the threshold value.

The motion estimation mode decider employs a half-pixel based motion estimation mode if the average compensation error and the minimal SAD are less than the threshold values irrespective of the candidate motion vector variance.

The motion vector estimator may include a half-pixel based mode execution unit to execute motion estimation in a half-pixel based mode; a three-stage search mode execution unit to execute a three-stage search mode; a block split mode execution unit to execute a block split mode; and a switching unit to switch the results from the half-pixel based mode execution unit, the three-stage search mode execution unit, and the block split mode execution unit.

In another aspect of the present invention, there is provided a motion estimation method including the operations of calculating a specified block error based on candidate motion vectors previously estimated and spatiotemporarily neighboring on a present block; deciding a motion estimation mode for the present block to be processed based on the calculated block error; and estimating a final motion vector in the decided motion estimation mode.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1A and 1B are views illustrating candidate motion vectors;

FIG. 2 is a block diagram illustrating a motion estimation apparatus according to an embodiment of the present invention;

FIG. 3 is a block diagram illustrating a motion vector estimator as illustrated in FIG. 2;

DETAILED DESCRIPTION OF THE EMBODIMENTS

Figure 4A:
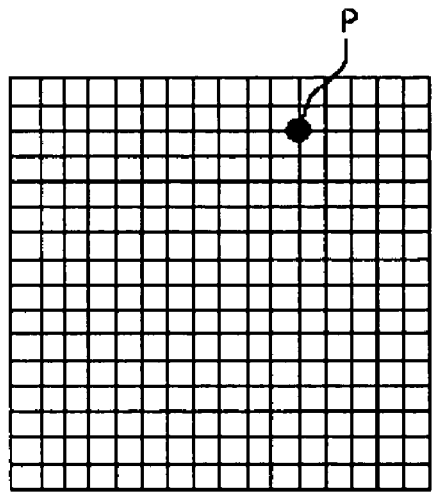
FIGS. 4A and 4B are views explaining a half-pixel based motion estimation mode.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIGS. 1A and 1B illustrate a candidate motion vector, but first, a block matching motion estimation technique that is generally used in motion estimation will be briefly described. A present frame is split into a predetermined number of blocks. In a block to be processed in the present frame (n), a most similar block is searched for in a search region of a previous frame (n−1) and a transition vector between the present block to be processed and the optimally similar block is set as a motion vector. As a criterion to measure a similarity between the blocks, a Sum of Absolute Difference (SAD(D)) may be used. The SAD is expressed as Equation (1) below:

$$SAD(D) = \underset{x \in B(x)}{Q} |F(x, n) - F(x - D, n - 1)| \tag{1}$$

where, x denotes a spatial coordinate of pixels within each block, B(x) denotes a present block to be processed, n denotes a present frame, n−1 denotes a previous frame, D denotes a candidate motion vector within a search region, and F denotes pixel data within a frame.

The candidate motion vector applied to a motion estimation apparatus 100 according to the present invention will now be described with reference to FIGS. 1A and 1B. FIG. 1A illustrates the previous frame as having been split into a predetermined number of blocks, and FIG. 1B illustrates the present frame as being split into the predetermined number of blocks.

As shown in FIG. 1A, in the previous frame, motion vectors for all blocks are estimated using the block matching motion estimation technique. Meanwhile, as shown in FIG. 1B, in the present frame, a motion vector for a block before the present block B to be processed is estimated.

In this embodiment, the candidate motion vector employs the motion vector for the block having the motion vector previously estimated, and comprises block B of the previous frame along with the neighboring blocks of the previous frame and of blocks neighboring the present block B to be processed. In other words, as shown by a candidate motion vector (CMV) region of FIGS. 1A and 1B, the candidate motion vector is comprised of nine blocks of the previous frame and four blocks of the present frame, using a spatiotemporal correlation. Here, it is understood that the invention is not limited to the use of only nine block of the previous frame and four blocks of the present frame and that other numbers of blocks of the present frame may be used as long as they maintain the above-noted spatiotemporal correlation with present block B.

FIG. 2 is a block diagram illustrating the motion estimation apparatus according to an embodiment of the present invention. Referring to FIG. 2, the motion estimation apparatus 100 includes a block error calculator 110, a motion estimation mode decider 120, and a motion vector estimator 130.

The block error calculator 110 calculates a specified block error based on the candidate motion vector that is previously estimated and spatiotemporarily neighbors an input block. The block error includes a candidate motion vector variance, an average compensation error, and a minimal SAD.

The block error calculator 110 calculates the candidate motion vector variance ($MV_{var}$) of the thirteen blocks (nine blocks of the previous frame and four blocks of the present frame) using Equation (2):

$$MV_{var} = \frac{1}{N} \sum_{D \in CS} \left\| D - \frac{1}{N} \sum_{D \in CS} D \right\|^2 \tag{2}$$

where, N denotes the number of total candidate motion vectors, D denotes a candidate motion vector, and CS denotes a set of total candidate motion vectors.

The block error calculator 110 calculates the average compensation error (Error$_{Avg}$) using Equation (3):

$$\alpha = 2 \times \frac{\sqrt{D_x^2 + D_y^2}}{\sqrt{D_{maxx}^2 + D_{maxy}^2}}$$

$$CompError(D) = SAD(D) \times \alpha$$

$$Error_{Avg} = \frac{1}{N} \sum_{D \in CS} CompError(D)$$

(3)

where, α denotes a scaling constant, Dx and Dy denote motion vectors in directions of x and y axes, Dmaxx and Dmaxy denote maximal motion vectors in directions of x and y axes, and CompError(D) denotes a scaling value of the SAD(D).

A reason why the SAD(D) is scaled to a magnitude of the candidate motion vector in Equation 3 is so that the average compensation error is calculated using a greater SAD(D) as opposed to an actually calculated SAD(D), that is calculated based on the magnitude of the candidate motion vector. This is because a measurement of a magnitude of the motion vector is reduced in reliability as the motion vector increases in magnitude.

The block error calculator 110 calculates the minimal SAD (SAD(D)$_{min}$) from the candidate motion vectors, using Equation (4):

$$SAD(D)_{min} = \min_{D \in CS} SAD(D) \ldots$$

(4)

The motion estimation mode decider 120 determines a motion estimation mode of the present block to be processed based on the block error calculated in the block error calculator 110. Here, it is desirable that the motion estimation mode includes a half-pixel based mode, a three-stage search mode, and a block split mode.

The motion estimation mode decider 120 employs the half-pixel based motion estimation mode when the candidate motion vector variance, the average compensation error, and the minimal SAD(D) calculated in the block error calculator 110 are all found to be less than their threshold values.

Here, it is noted that the candidate motion vector variance is not greatly influenced by contents of an input moving image, and that a variance of an even motion vector is relatively small. Therefore, a fixed threshold value is used.

In contrast, the average compensation error and the minimal SAD(D) of each candidate motion vector are greatly influenced depending on the contents of the moving image. Therefore, in this embodiment, after the variance value (Var (B)) at each block of the previous frame is calculated using Equation (5) below, the threshold values (TH$_{error}$) for the average compensation error and the minimal SAD(D) are determined using an average value (M) within the total frames of the calculated variance value (Var (B)).

$$Var(B) = \frac{\sum_{x \in B} |F(x, n-1) - M|^2}{N_s^2 - 1}$$

$$M = \frac{\sum_{x \in B} F(x, n-1)}{N_s}$$

(5)

$$TH_{error} = \frac{\sum_{B \in F} Var(B)}{N_{Ho} \times N_{Ve}} \times 0.7$$

where, Ns denotes the size of a block, and N$_{Ho}$ and N$_{Ve}$ denote the numbers of horizontal and vertical blocks for the total number of frames.

The motion estimation mode decider 120 employs the block split mode when the candidate motion vector variance and the average compensation error calculated in the block error calculator 110 are determined to be less than threshold values thereof and the minimal SAD(D) is determined to be greater than the threshold value thereof.

The motion estimation mode decider 120 employs the three-stage search mode when the candidate motion vector variance is determined to be less than the threshold value and the average compensation error is determined to be greater than the threshold value.

The motion estimation mode decider 120 employs the half-pixel based motion estimation mode when the average compensation error and the minimal SAD are determined to be less than the threshold values, irrespective of the candidate motion vector variance.

The aforementioned motion estimation mode deciding method of the motion estimation mode decider 120 may be programmed by the following "if~else" programming loop:

```
if(MV_var < TH_var)
    if(Error_AVG < TH_error)
        if(SAD_min < TH_error × α) Half_pel_refinement
        else Block_split
    else Three_stage_search
else
    if(Error_Avg < TH_error)
        if(SAD(D)_min < TH_error × α) Half_pel_refinement
        else Three_stage_search
    else Three_stage_search;
``` where, "Half_pel_refinement" denotes the half-pixel based mode, "Three_stage_search" denotes the three stage search mode, and "Block_split" denotes the block split mode.

The motion vector estimator 130 estimates a final motion vector in the motion estimation mode, or in other words, in any one of the two half-pixel based motion estimation modes, the block split mode, and/or the three-stage search mode that are decided in the motion estimation mode decider 120. The motion vector estimator 130 will be in more detail described in FIG. 3 below.

Figure 4B:
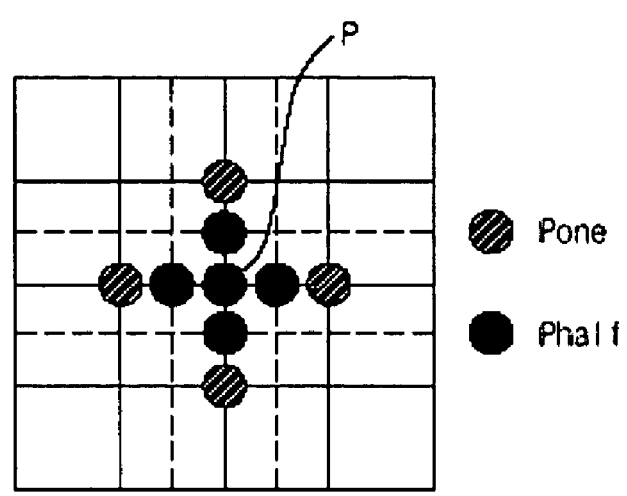
Figure 5:
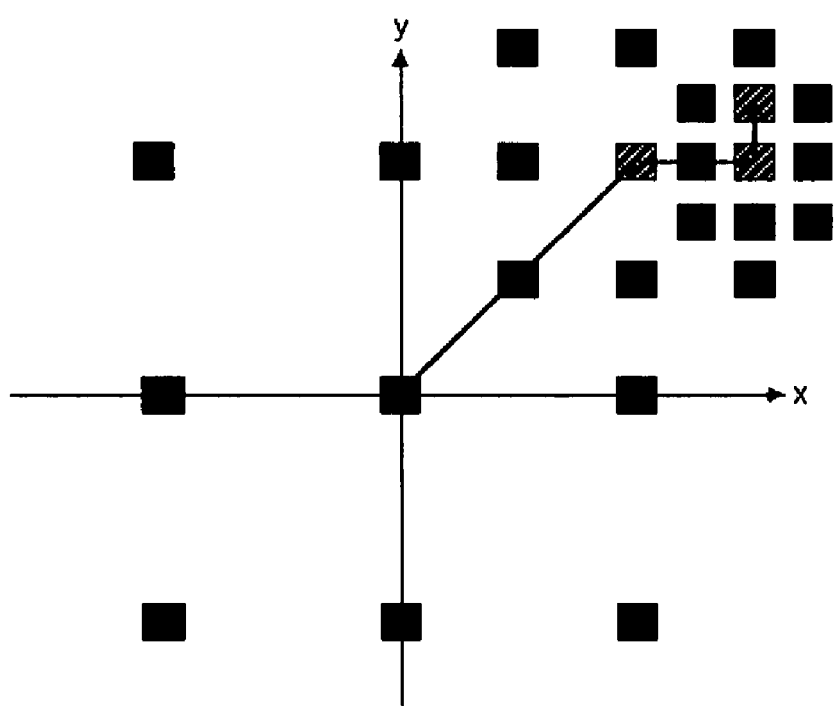
FIG. 5 is a view explaining a three-stage search mode.
Figure 6A:
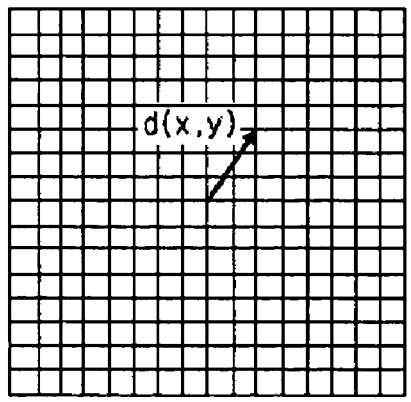
FIGS. 6A and 6B are views illustrating a block split mode.
Figure 6B:
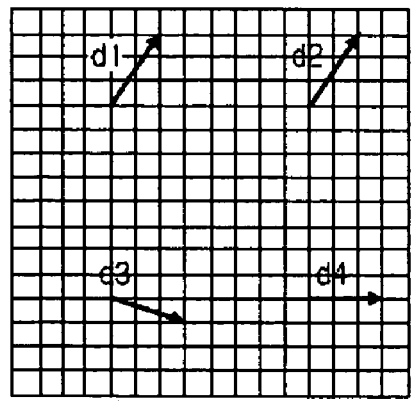

FIG. 3 is a block diagram illustrating the motion vector estimator shown in FIG. 2. FIGS. 4A and 4B illustrate the half-pixel based motion estimation mode. FIG. 5 illustrates the three-stage search mode, and FIGS. 6A and 6B illustrate the block split mode.

Referring to FIG. 3, the inventive motion vector estimator 130 includes a half-pixel based mode execution unit 132, a three-stage search mode execution unit 134, a block split mode execution unit 136, and a switching unit 138. If the motion estimation mode decider 120 estimates motion in the half-pixel based mode, the half-pixel based mode execution unit 132 estimates the motion in the half-pixel based mode.

The half-pixel based mode already known in the art will now be briefly described with reference to FIGS. 4A and 4B. In FIG. 4B, intersections of solid lines denote an original pixel, and intersection of dotted lines denote an interpolated pixel. FIG. 4A illustrates an estimated pixel-based motion vector. In FIG. 4B, "$P_{one}$" denotes a pixel value of a general pixel position, and "$P_{half}$" denotes a pixel value interpolated at a half-pixel position. As such, the motion vector may be estimated using the interpolated pixel value interpolated at the half-pixel position.

If the motion estimation mode decider 120 estimates the motion in the three-stage search mode, the three-stage search mode execution unit 134 estimates the motion in the three-stage search mode, which will be briefly described with reference to FIG. 5.

As shown in FIG. 5, in the three-stage search mode, the search region is adaptively reduced as a stage increases, and the motion vector is extracted in the finally reduced search region. Thus, an initial search region, that is, nine candidate vectors, are searched for an optimal motion vector, and then the initial search region is reduced and again candidate vectors of the reduced search region are searched for an optimal motion vector. The search region is again reduced and candidate vectors of the again reduced search region are again searched for an optimal motion vector. Then, in the last stage of the three-stage search mode, the motion vector is extracted on a per-one pixel basis.

If the motion estimation mode decider 120 estimates the motion in the block split mode, the block split mode execution unit 136 estimates the motion in the block split mode.

The block split mode will now be briefly described with reference to FIGS. 6A and 6B. FIG. 6A illustrates the candidate motion vector extracted in one block, and FIG. 6B illustrates a state where one block is subdivided and split into four blocks. As shown in FIG. 6B, it may be determined that regions of d1 and d2 having the same motion vector as FIG. 6A are the even motion vectors. However, it may also be determined that regions of d3 and d4, having motion vectors that are different from those of FIG. 6A, are edge generation regions, and therefore the motion vectors are again extracted in the regions of d3 and d4. By doing so, the motion vectors may be extracted with more accuracy. In other words, the block split mode execution unit 136 splits the block, calculates each block error for the split block, and extracts the final motion vector based on the calculated block error.

The switching unit 138 switches the results of the half-pixel based mode execution unit 132, the three-stage search mode execution unit 134, and the block split mode execution unit 136.

Figure 7:
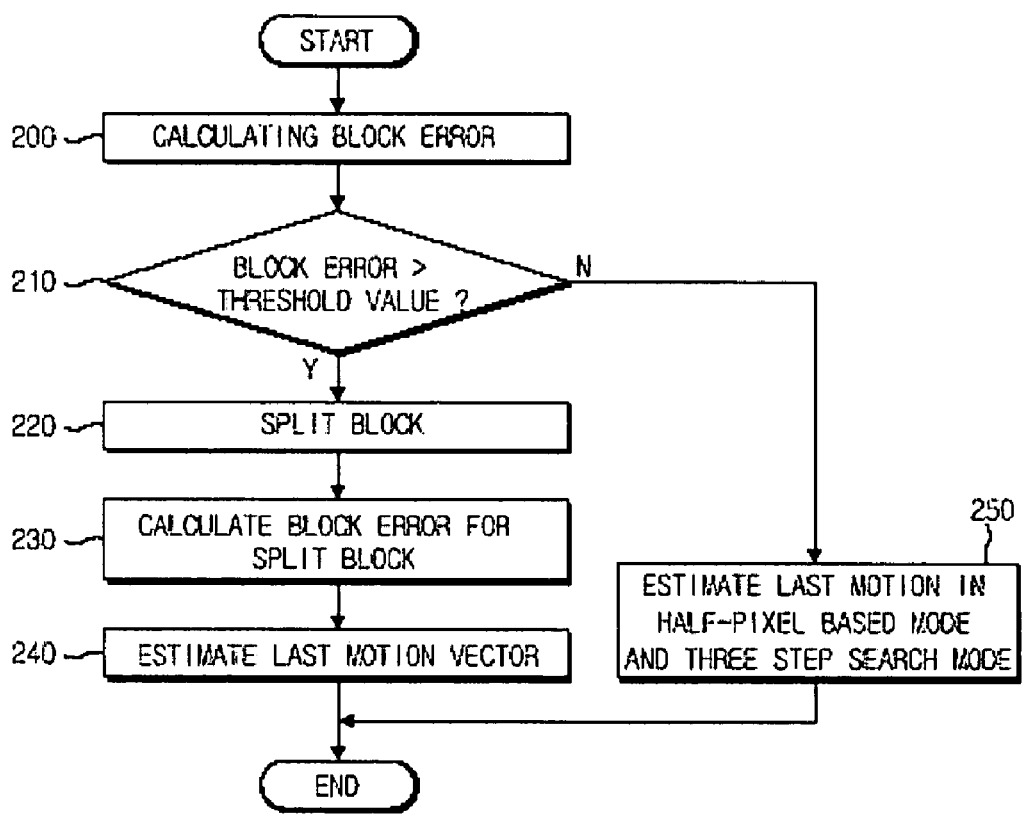
FIG. 7 is a flowchart illustrating a motion estimation method according to the present invention.

FIG. 7 is a flowchart illustrating a motion estimation method according to an aspect of the present invention. The motion estimation method will be described with reference to FIG. 1 to 7.

If the block is inputted, the block error calculator 110 calculates the specified block error (200). The block error calculated in the block error calculator 110 includes the candidate motion vector variance, the average compensation error, and the minimal SAD(D).

If the block error is calculated, the motion estimation mode decider 120 determines the motion estimation mode for the present block to be processed based on the calculated block error. The deciding of the motion estimation mode is performed through a comparison of magnitudes of the block error value and the predetermined threshold value (210).

If the block error value is determined to be greater than the threshold value in operation 210, the motion estimation mode decider 120 estimates the motion in the block split mode, and the block split mode execution unit 136 of the motion vector estimator 130 splits the block (220).

The block split mode execution unit 136 calculates each block error for the split blocks (230), and estimates the last motion vector on the basis of the calculated block error (240).

If the block error value is determined to be less than the threshold value in operation 210, the motion estimation mode decider 120 estimates the last motion vector in the half-pixel based mode or in the three-stage search mode (250).

In a synthesis of the method described above, the inventive motion estimation apparatus and method employs an adaptive motion estimation mode based on the candidate motion vector variance, the average compensation error, and the minimal SAD(D) so as to solve a disadvantage of motion estimation using a conventional whole region search method based on a block matching mode.

In a more detailed description, the conventional whole region search method based on the block matching mode estimates a relatively accurate motion vector but has a drawback in that a direction having a minimal SAD(D) does not represent an ordinarily accurate motion of an object. However, in the inventive motion estimation apparatus and method where an amount of variation of the motion vector and the average block error are found to be less using the candidate motion vectors of the previous frame and the present frame, it may be assumed to be a continuously varying linear motion and the candidate motion vector may be simply-estimated to maintain an evenness of the motion vector.

As is described above, the inventive motion estimation apparatus and method have an advantage of adaptively employing the motion estimation mode in a different fashion based on a characteristic of the motion vector at each block, that is, based on the candidate motion vector variance, the average compensation error, and the minimal SAD so as to improve an estimate of the even motion vector.

Further, the inventive motion estimation apparatus and method have an advantage of again splitting the block that is split in the block split mode, to accurately detect an object edge region existing within the block, and to prevent deterioration of blocking at the object edge region.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A motion estimation apparatus, comprising:
a block error calculator to calculate a specified block error based on a candidate motion vector previously estimated and spatiotemporarily neighboring on a present block;
a motion estimation mode decider to determine a motion estimation mode for the present block to be processed based on the calculated block error; and
a motion vector estimator to estimate a final motion vector in the decided motion estimation mode, wherein
the block error has a candidate motion vector variance, an average compensation error, and a minimal SAD (Sum of Absolute Difference), wherein the motion vector estimator comprises:
a half-pixel based mode execution unit to execute motion estimation in a half-pixel based mode;
a three-stage search mode execution unit to execute a three-stage search mode;
a block split mode execution unit to execute a block split mode; and
a switching unit to switch the results from the half-pixel based mode execution unit, the three-stage search mode execution unit, and the block split mode execution unit.

2. The apparatus as claimed in claim 1, wherein the candidate motion vector is a motion vector of a block having a motion vector previously estimated before the present block to be processed.

3. The apparatus as claimed in claim 2, wherein the block having the motion vector estimated is comprised of nine blocks of a previous frame and four blocks of a present frame, using a spatiotemporal correlation.

4. The apparatus as claimed in claim 1, wherein the block error calculator calculates the candidate motion vector variance ($MV_{var}$) using the following Equation:

$$MV_{var} = \frac{1}{N} \sum_{D \in CS} \left\| D - \frac{1}{N} \sum_{D \in CS} D \right\|^2$$

where, N denotes the number of total candidate motion vectors, D denotes a candidate motion vector, and CS denotes a set of total candidate motion vectors.

5. The apparatus as claimed in claim 1, wherein the block error calculator calculates the average compensation error ($Error_{Avg}$) using the following the Equation:

$$\alpha = 2 \times \frac{\sqrt{D_x^2 + D_y^2}}{\sqrt{D_{maxx}^2 + D_{maxy}^2}}$$

$$CompError(D) = SAD(D) \times \alpha$$

$$Error_{Avg} = \frac{1}{N} \sum_{D \in CS} CompError(D)$$

where, α denotes a scaling constant, Dx and Dy denote motion vectors in directions of x and y axes, Dmaxx and Dmaxy denote maximal motion vectors in directions of x and y axes, and CompError(D) denotes a scaling value of SAD(D).

6. The apparatus as claimed in claim 1, wherein the block error calculator calculates the minimal SAD ($SAD(D)_{min}$) using the following Equation:

$$SAD(D)_{min} = \min_{D \in CS} SAD(D)$$

where, D denotes a candidate motion vector, and CS denotes a set of total candidate motion vectors.

7. The apparatus as claimed in claim 1, wherein the motion estimation mode decider employs a half-pixel based motion estimation mode if the candidate motion vector variance, the average compensation error, and the minimal SAD are all less than threshold values.

8. The apparatus as claimed in claim 7, wherein the motion estimation mode decider employs a block split mode if the candidate motion vector variance and the average compensation error are found to be less than the threshold values, and the minimal SAD is found to be greater than the threshold value.

9. The apparatus as claimed in claim 8, wherein the motion estimation mode decider employs a three-stage search mode if the candidate motion vector variance is found to be less than the threshold value and the average compensation error is found to be greater than the threshold value.

10. The apparatus as claimed in claim 7, wherein the motion estimation mode decider employs a three-stage search mode if the candidate motion vector variance is found to be less than the threshold value and the average compensation error is found to be greater than the threshold value.

11. The apparatus as claimed in claim 1, wherein the motion estimation mode decider employs a block split mode if the candidate motion vector variance and the average compensation error are found to be less than the threshold values, and the minimal SAD is found to be greater than the threshold value.

12. The apparatus according to claim 11, wherein the employing of the block split mode comprises splitting the present block, calculating each block error for the split block, and extracting the final motion vector based on the calculated block error.

13. The apparatus as claimed in claim 11, wherein the motion estimation mode decider employs a three-stage search mode if the candidate motion vector variance is found to be less than the threshold value and the average compensation error is found to be greater than the threshold value.

14. The apparatus as claimed in claim 1, wherein the motion estimation mode decider employs a three-stage search mode if the candidate motion vector variance is found to be less than the threshold value and the average compensation error is found to be greater than the threshold value.

15. The apparatus according to claim 14, wherein the three-stage search mode comprises adaptatively reducing a search region of the present block as a stage increases and extracting an optimal motion vector from the reduced search region.

16. The apparatus as claimed in claim 1, wherein the motion estimation mode decider employs a half-pixel based motion estimation mode if the average compensation error and the minimal SAD are found to be less than threshold values irrespective of the candidate motion vector variance.

17. The apparatus according to claim 1, wherein, in the half-pixel based mode, the final motion vector is estimated using an interpolated pixel value interpolated at a half-pixel position.

18. The apparatus according to claim 1, wherein, in the three-stage search mode, a search region of the present block is adaptatively reduced as a stage increases and an optimal motion vector is extracted from the finally reduced search region.

19. The apparatus according to claim 1, wherein, in the block split mode the input block is split, each block error for the split block is calculated, and the final motion vector based on the calculated block error is extracted.

20. A motion estimation method, comprising:
calculating a specified block error based on a candidate motion vector previously estimated and spatiotemporarily neighboring on a present block;
deciding a motion estimation mode of the present block to be processed based on the calculated block error; and
estimating a last motion vector in the decided motion estimation mode, wherein the block error has a candidate motion vector variance, average compensation error, and minimal SAD (Sum of Absolute Difference),
wherein estimating a last motion vector in the decided motion estimation mode comprises:
executing motion estimation in a half-pixel based mode;
executing a three-stage search mode;
executing a block split mode; and
switching the results from the half-pixel based mode execution, the three-stage search mode execution, and the block split mode execution.

21. The method as claimed in claim 20, wherein the candidate motion vector is a motion vector of a block having a motion vector previously estimated before the present block to be processed.

22. The method as claimed in claim 21, wherein the block having the motion vector estimated comprised nine blocks of a previous frame and four blocks of a present frame, using a spatiotemporal correlation.

23. The method as claimed in claim 20, wherein, in the calculating of the block error, the candidate motion vector variance ($MV_{var}$) is calculated using the following Equation:

$$MV_{var} = \frac{1}{N} \sum_{D \in CS} \left\| D - \frac{1}{N} \sum_{D \in CS} D \right\|^2$$

where, N denotes the number of total candidate motion vectors, D denotes a candidate motion vector, and CS denotes a set of total candidate motion vectors.

24. The method as claimed in claim 20, wherein, in the calculating of the block error, the average compensation error ($Error_{Avg}$) is calculated using the following the Equation:

$$\alpha = 2 \times \frac{\sqrt{D_x^2 + D_y^2}}{\sqrt{D_{maxx}^2 + D_{maxy}^2}}$$

$$CompError(D) = SAD(D) \times \alpha$$

$$Error_{Avg} = \frac{1}{N} \sum_{D \in CS} CompError(D)$$

where, α denotes a scaling constant, Dx and Dy denote motion vectors in directions of x and y axes, Dmaxx and Dmaxy denote maximal motion vectors in directions of x and y axes, and CompError(D) denotes a scaling value of SAD(D).

25. The method as claimed in claim 20, wherein, in the calculating of the block error, the minimal SAD ($SAD(D)_{min}$) is calculated using the following Equation:

$$SAD(D)_{min} = \min_{D \in CS} SAD(D)$$

where, D denotes a candidate motion vector, and CS denotes a set of total candidate motion vectors.

26. A motion estimation method, comprising:
calculating a specified block error based on a candidate motion vector previously estimated and spatiotemporarily neighboring on a present block;
deciding a motion estimation mode of the present block to be processed based on the calculated block error; and
estimating a last motion vector in the decided motion estimation mode, wherein
the block error has a candidate motion vector variance, average compensation error, and minimal SAD (Sum of Absolute Difference), wherein the deciding of the motion estimation mode comprises employing a half-pixel based motion estimation mode if the candidate motion vector variance, the average compensation error, and the minimal SAD are all found to be less than threshold values.

27. A motion estimation method, comprising:
calculating a specified block error based on a candidate motion vector previously estimated and spatiotemporarily neighboring on a present block;
deciding a motion estimation mode of the present block to be processed based on the calculated block error; and
estimating a last motion vector in the decided motion estimation mode, wherein the block error has a candidate motion vector variance, average compensation error, and minimal SAD (Sum of Absolute Difference), wherein the deciding of the motion estimation mode comprises employing a block split mode if the candidate motion vector variance and the average compensation error are found to be less than threshold values, and the minimal SAD is found to be greater than a threshold value.

28. A motion estimation method, comprising:
calculating a specified block error based on a candidate motion vector previously estimated and spatiotemporarily neighboring on a present block;
deciding a motion estimation mode of the present block to be processed based on the calculated block error; and
estimating a last motion vector in the decided motion estimation mode, wherein
the block error has a candidate motion vector variance, average compensation error, and minimal SAD (Sum of Absolute Difference), wherein the deciding of the motion estimation mode comprises employing a three-stage search mode if the candidate motion vector variance is found to be less than threshold values, and the average compensation error is found to be greater than a threshold value.

29. A motion estimation method, comprising:
calculating a specified block error based on a candidate motion vector previously estimated and spatiotemporarily neighboring on a present block;
deciding a motion estimation mode of the present block to be processed based on the calculated block error; and
estimating a last motion vector in the decided motion estimation mode, wherein
the block error has a candidate motion vector variance, average compensation error, and minimal SAD (Sum of Absolute Difference), wherein the deciding of the motion estimation mode comprises employing a half-pixel based motion estimation mode if the average compensation error and the minimal SAD are found to be less than threshold values irrespective of the candidate motion vector variance.

30. A motion estimation apparatus, comprising:
a block error calculator to calculate a specified block error based on a candidate motion vector previously estimated and spatiotemporarily neighboring on a present block;
a motion estimation mode decider to determine a motion estimation mode for the present block to be processed based on the calculated block error; and
a motion vector estimator to estimate a final motion vector in the decided motion estimation mode, wherein
the block error has a candidate motion vector variance, average compensation error, and minimal SAD (Sum of Absolute Difference), wherein
the motion estimation mode decider employs a half-pixel based motion estimation mode if the candidate motion vector variance, the average compensation error, and the minimal SAD are all found to be less than threshold values.

31. A motion estimation apparatus, comprising:
a block error calculator to calculate a specified block error based on a candidate motion vector previously estimated and spatiotemporarily neighboring on a present block;
a motion estimation mode decider to determine a motion estimation mode for the present block to be processed based on the calculated block error; and
a motion vector estimator to estimate a final motion vector in the decided motion estimation mode, wherein the block error has a candidate motion vector variance, average compensation error, and minimal SAD (Sum of Absolute Difference), wherein the motion estimation mode decider employs a block split mode if the candidate motion vector variance and the average compensation error are found to be less than threshold values, and the minimal SAD is found to be greater than a threshold value.

32. A motion estimation apparatus, comprising:

a block error calculator to calculate a specified block error based on a candidate motion vector previously estimated and spatiotemporarily neighboring on a present block:

a motion estimation mode decider to determine a motion estimation mode for the present block to be processed based on the calculated block error: and a motion vector estimator to estimate a final motion vector in the decided motion estimation mode, wherein the block error has a candidate motion vector variance, average compensation error, and minimal SAD (Sum of Absolute Difference), wherein the motion estimation mode decider employs a three-stage search mode if the candidate motion vector variance is found to be less than threshold values, and the average compensation error is found to be greater than a threshold value.

33. A motion estimation apparatus, comprising:

a block error calculator to calculate a specified block error based on a candidate motion vector previously estimated and spatiotemporarily neighboring on a present block:

a motion estimation mode decider to determine a motion estimation mode for the present block to be processed based on the calculated block error: and a motion vector estimator to estimate a final motion vector in the decided motion estimation mode, wherein the block error has a candidate motion vector variance, average compensation error, and minimal SAD (Sum of Absolute Difference), wherein the motion estimation mode decider employs a half-pixel based motion estimation mode if the average compensation error and the minimal SAD are found to be less than threshold values irrespective of the candidate motion vector variance.

\* \* \* \* \*

UNITED STATES PATENT AND TRADEMARK OFFICE
CERTIFICATE OF CORRECTION

PATENT NO. : 8,045,619 B2  Page 1 of 1
APPLICATION NO. : 11/336837
DATED : October 25, 2011
INVENTOR(S) : Ho-young Lee et al.

It is certified that error appears in the above-identified patent and that said Letters Patent is hereby corrected as shown below:

Column 13, Line 12, In Claim 32, delete "block:" and insert -- block; --, therefor.

Column 13, Line 15, In Claim 32, delete "error:" and insert -- error; --, therefor.

Column 14, Line 7, In Claim 33, delete "block:" and insert -- block; --, therefor.

Column 14, Line 10, In Claim 33, delete "error:" and insert -- error; --, therefor.

Signed and Sealed this
Twenty-eighth Day of February, 2012

David J. Kappos
*Director of the United States Patent and Trademark Office*